Oct. 24, 1972 J. L. GROSH 3,700,527
TRANSVERSE FILAMENT REINFORCING TAPE AND METHODS
AND APPARATUS FOR THE PRODUCTION THEREOF
Original Filed May 29, 1967 4 Sheets-Sheet 1

JAMES L. GROSH
INVENTOR.

BY *Steven F. Stone*

ATTORNEY

JAMES L. GROSH
INVENTOR.

Oct. 24, 1972  J. L. GROSH  3,700,527
TRANSVERSE FILAMENT REINFORCING TAPE AND METHODS
AND APPARATUS FOR THE PRODUCTION THEREOF
Original Filed May 29, 1967  4 Sheets-Sheet 3
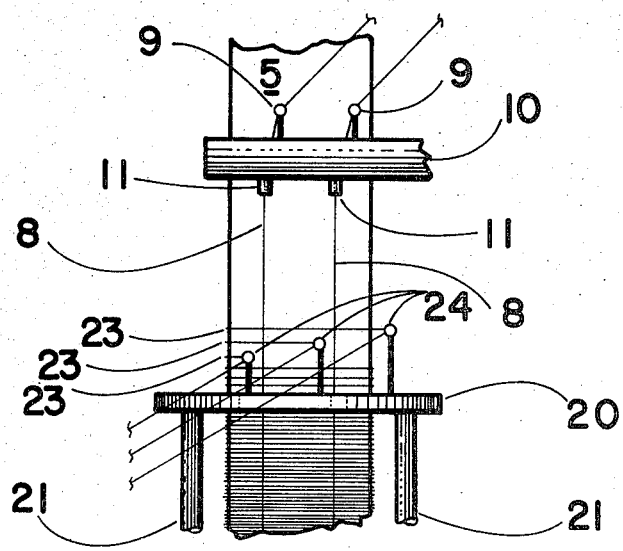
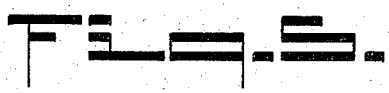
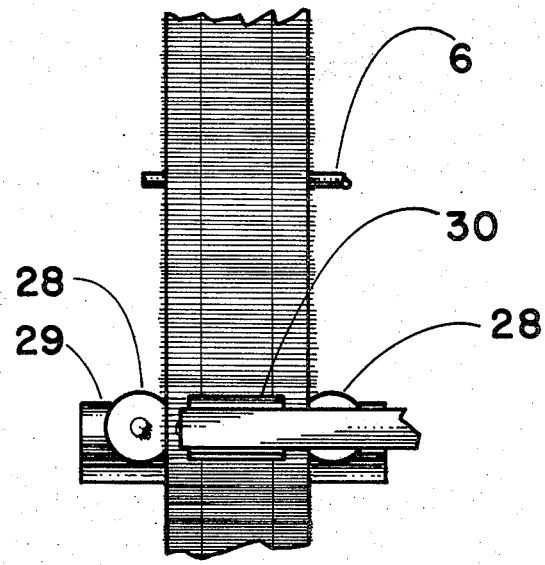
JAMES L. GROSH
*INVENTOR.*
BY *[signature]*
ATTORNEY Oct. 24, 1972  J. L. GROSH  3,700,527
TRANSVERSE FILAMENT REINFORCING TAPE AND METHODS
AND APPARATUS FOR THE PRODUCTION THEREOF
Original Filed May 29, 1967  4 Sheets-Sheet 4
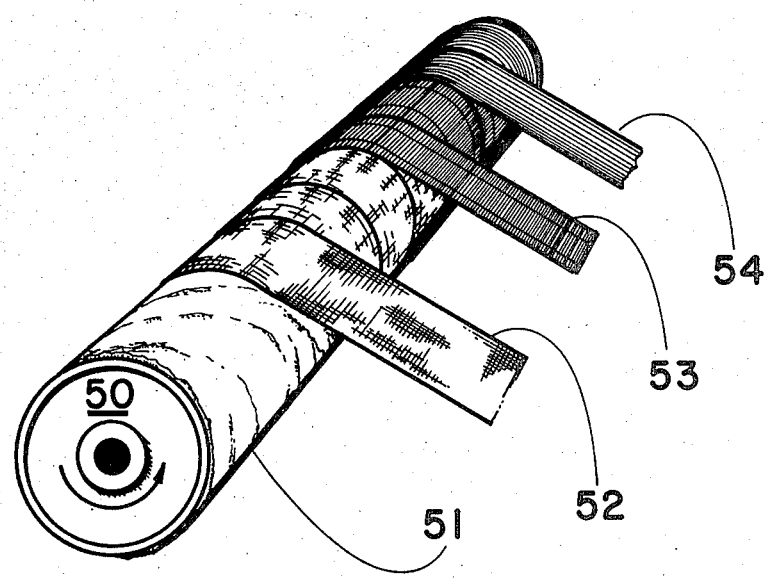
FIG-7.
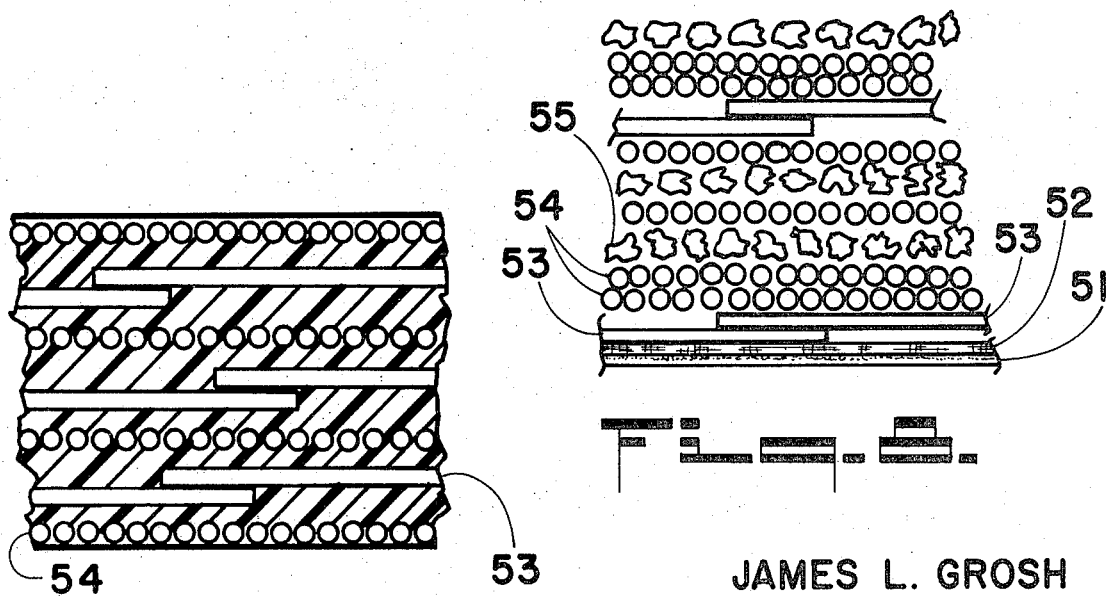
FIG-8.
FIG-9.
JAMES L. GROSH
INVENTOR.
BY *Steven F. Stone*
ATTORNEY

United States Patent Office 3,700,527
Patented Oct. 24, 1972

3,700,527
TRANSVERSE FILAMENT REINFORCING TAPE AND METHODS AND APPARATUS FOR THE PRODUCTION THEREOF
James L. Grosh, Los Altos, Calif., assignor to United Aircraft Corporation, East Hartford, Conn.
Continuation of abandoned application Ser. No. 641,963, May 29, 1967. This application Mar. 11, 1970, Ser. No. 18,740
Int. Cl. B65h 81/08
U.S. Cl. 156—426
4 Claims

ABSTRACT OF THE DISCLOSURE

A longitudinally extending nonwoven tape comprising longitudinally extending tacking strands supporting a multiplicity of transverse filament bundles. The tape is manufactured by continuously depositing adhesive coated tacking strands onto both sides of a continuous moving double band and continuously winding filament bundles over said strands and around said band. The band is passed between rollers and heated to bond the filament to the tacking strand. The band is then passed against a cutter which severs the wound filaments between the bands and permits the longitudinally extending tape to be removed from the band. The tape is used to provide longitudinal reinforcement of reinforced plastic pipe by winding the tape around the mandrel in the pipe fabrication process.

---

This application is a continuation of my application, Ser. No. 641,963, filed May 29, 1967 (now abandoned).

BACKGROUND OF THE INVENTION

Filament winding techniques are currently finding wide application in the production of pipes and conduits and other hollow bodies such as described in my copending coassigned patent applications, Ser. No. 546,676, filed May 2, 1966, for "Composite Reinforced Plastic Pipe" and Ser. No. 641,962, of like date herewith for "Composite Reinforced Plastic Pipe."

Such objects are generally formed by winding resin coated high tensile strength filaments or fibers around a mandrel, curing the resin and removing the mandrel. The resultant body is characterized by high hoop strength with relatively little beam bending or longitudinal strength. Various methods of increasing the beam bending and longitudinal strength have been employed and include wrapping woven high tensile strength fabric sheets around the mandrel, laying longitudinally oriented high strength filaments either as individual filaments or as sheets of filaments along the length of the mandrel, incorporating chopped, randomly oriented fibers into the body and helically winding rather than hoop winding the filaments. Woven fabric sheet reinforcement is quite expensive and is essentially wasteful in that it provides both longitudinal and hoop strength where only longitudinal strength is required. The use of longitudinally extending reinforcing fibers or sheets of filaments produces a good product but fabrication is more complex and expensive. The use of chopped rovings is both inefficient and costly and helical winding techniques require wasteful end trimming of the product.

No reinforcing material is known to be manufactured in a form such that longitudinal reinforcement of a reinforced plastic body can be obtained by a continuous winding process. Sheets of reinforcing fabric, for example, have both a fixed width and length and are applied by a noncontinuous layup operation.

A tape that can be continuously wound around a mandrel is a basic requirement for any continuous fabrication process. For the most efficient and economical utilization of the material of the tape to provide longitudinal reinforcement in a reinforced plastic body, the tape should have unidirectional strength transverse of the length thereof. If transverse tensile strength is at least two orders of magnitude (i.e. at least 100 times) greater than the longitudinal tensile strength, winding of the tape into a reinforced plastic body will produce essentially only longitudinal reinforcement of the body. However, no tape having the desired unidirectional strength characteristics is known to the prior art.

SUMMARY OF THE INVENTION

According to this invention a longitudinally extending tape having unidirectional strength transverse thereto is provided which consists of a plurality of parallel longitudinally extending tacking threads having a multiplicity of transversely oriented parallel filaments of relatively high tensile strength bonded thereto. As used herein the term "tape" described an elongated narrow material of fixed width and indeterminate length substantially greater than said width. Such a tape may be continuously wound into a reinforced plastic pipe to provide longitudinal reinforcement. The tape is substantially cheaper than woven or filament sheets, has strength only in the direction required, provides efficient and economical utilization of the material of the tape and greatly simplifies the fabrication process.

A process and machine for fabricating the tape of this invention is also provided wherein adhesive coated tacking threads are applied to opposite sides of a continuous band and the high strength filaments are wrapped around the band and over the threads and bonded to the threads. The body formed is slit longitudinally and removed from the moving band.

It is accordingly an object of this invention to provide a tape of indeterminate length having unidirectional strength transverse thereof.

It is another object of this invention to provide a machine for fabricating such tape.

It is another object of this invention to provide a process for manufacturing such tape.

It is another object of this invention to provide a reinforced plastic pipe having longitudinal reinforcement.

It is another object of this invention to provide a process for longitudinally reinforcing filament wound reinforced plastic pipe.

These and other objects of this invention will be readily apparent from the following description of the invention with reference to the accompanying drawings wherein:

FIG. 5 is a side elevation view of a portion of the machine of FIG. 3.

FIG. 6 is a side elevation of another portion of the machine of FIG. 4.

FIG. 7 is a schematic representation of the fabrication of pipe according to this invention.

FIG. 8 is a cross section through the wall of an embodiment of pipe fabricated according to the invention and FIG. 9 is a cross section through the wall of another embodiment of the pipe according to this invention.

Figure 1:
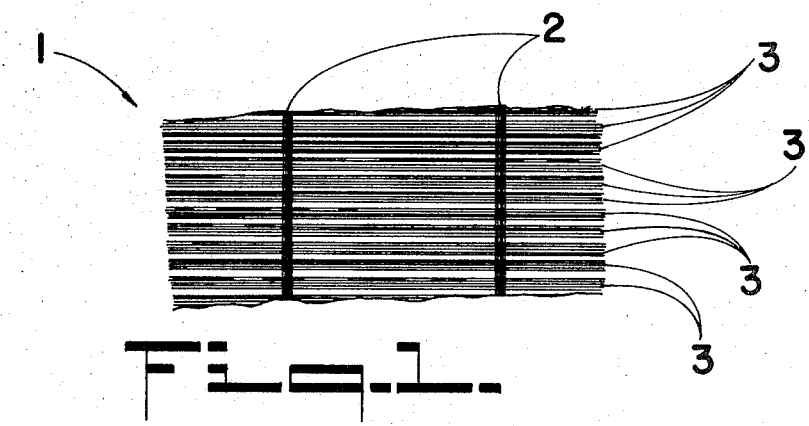
FIG. 1 is a plan view of a portion of a tape according to this invention.
Figure 2:
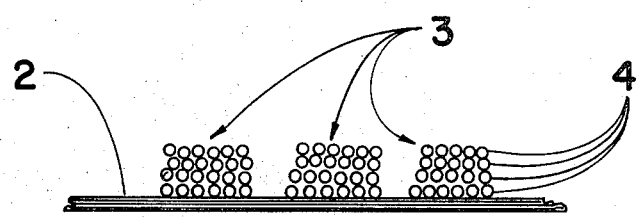
FIG. 2 is an enlarged side sectional view of a portion of the tape of FIG. 1.
Figure 3:
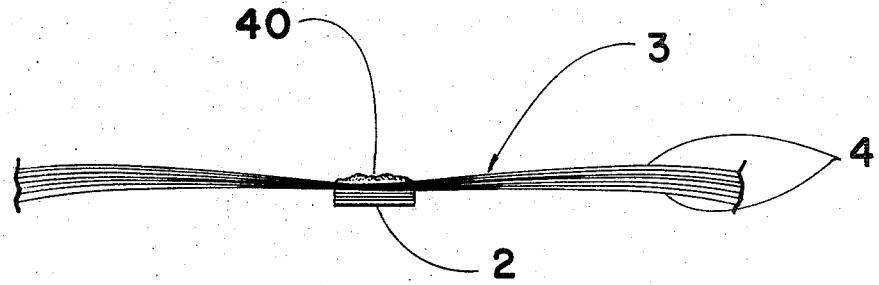
FIG. 3 is an enlarged front view of a portion of the tape of FIG. 1.

Referring now to FIGS. 1, 2, and 3, the tape 1 according to this invention consists of a plurality of parallel longitudinally extending tacking threads 2 having a multiplicity of transverse high strength filaments 3 bonded to the tacking threads 2 at the points of intersection therewith by adhesive 40.

As can be seen more clearly in FIGS. 2 and 3, the transverse filaments 3 each consist of a band comprising a multiplicity of individual monofilaments 4.

In the filament winding art, the terms "single end filament" and "multiple end filament" described filaments comprised of a plurality of individual monofilaments. A "single end filament" is a filament comprised of a multiplicity of monofilaments obtained from one bushing in the manufacturing process whereas "multiple end filaments" or "roving" describes a filament comprising a multiplicity of monofilaments obtained from a plurality of bushings. As used herein the term "filament band" describes a filament comprising a multiplicity of generally parallel monofilaments and includes both single end and multiple end filaments as well as a multiplicity of generally parallel braided monofilaments.

The function of the tacking threads is merely to support the transverse filaments and not to supply strength to the finished product. Accordingly, the threads 3 can be made from any fiber, filament, or thread such as cotton, nylon, glass, or rayon, for example. The number of such threads is preferably maintained as low as possible consistent with proper support of the transverse filaments and depending upon total width of the tape may range from 2 to 10 in number with four being adequate in most situations. The transverse filaments may be any high tensile strength material such as glass filaments, metal wire or filaments, or filaments of synthetic materials such as nylon, rayon or acrylic polymers. Glass fiber is the preferred material, however, because of its high strength, availability and corrosion resistance.

It should be emphasized that the function of the longitudinal tacking strands is merely to hold the transverse filaments in proper orientation and not to contribute any structural hoop strength in reinforced plastic bodies fabricated from the tape. Accordingly, the total number of transverse filaments is substantially greater than the number of longitudinal filaments whereby a longitudinal portion of this tape equal in length to the wide tape will have a transverse tensile strength substantially higher, i.e., at least two orders of magnitude higher, than the longitudinal tensile strength. When this condition is met, the longitudinal strength can be disregarded in the design of pipe according to this invention.

A representative tape manufactured according to this invention is 7½ inches wide, employs three tacking threads, each tacking thread comprising a single end glass filament of about 120 monofilaments and has eight transverse multiple end glass filaments per running inch, each multiple end filament containing about 2000 monofilaments. The transverse tensile strength of a 7½" length of such tape is over 300 times greater than the longitudinal strength. This ratio could be further increased by using fewer or smaller tacking threads or by substituting cotton thread for the glass tacking thread. When cotton is used, for example, the transverse tensile strength can be over 1000 times greater than the longitudinal strength.

Figure 4:
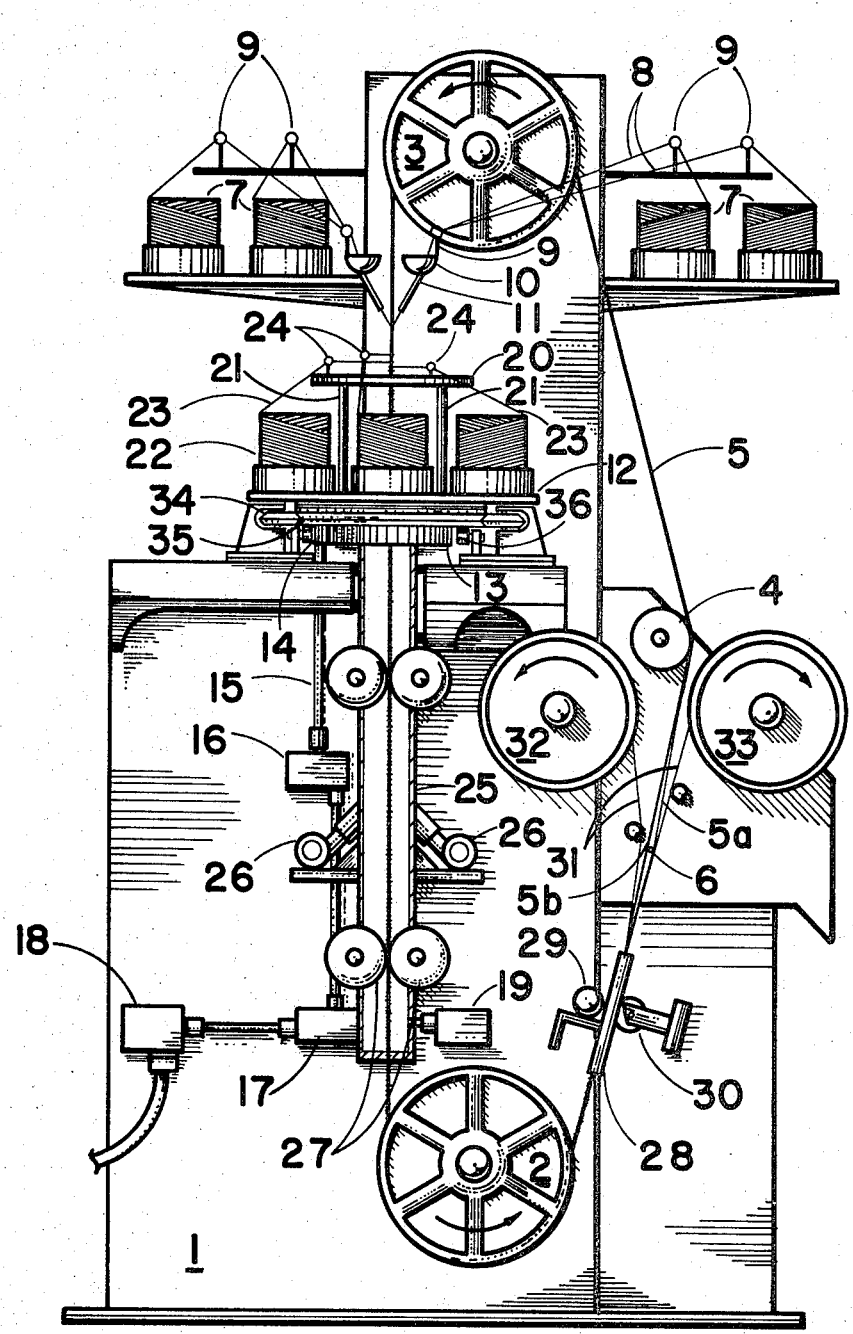
FIG. 4 is a front elevation partly in section of a machine for fabricating such tape.

Referring now to FIGS. 4, 5, and 6, a machine for fabricating the tape of this invention is shown. The machine comprises a vertical support frame 1 carrying rotatable wheels 2 and 3 and idler wheel 4 over which continuous band 5 is passed. Band 5 is preferably formed of two band elements 5a and 5b of similar width and aligned with each other so that bands 5a and 5b may be separated by passing over separator roller 6 to facilitate cutting and removal of the tape from the band 5 as will be more fully explained below.

Bands 5a and 5b may also be joined together along one edge in those instances where cutting of the tape on one side is desired. The external faces of band 5 are preferably coated with a release agent such as Teflon to facilitate removal of the tape.

Spools of the tacking thread are mounted on suitable supports attached to frame 1 and the tacking threads 8 are passed through guide eyelets 9 into glue pots 10 and out the bottom thereof through orifices 11 whereby the threads 8 are coated with an adhesive. A horizontal toroidal table 12 is mounted for rotation about its vertical axis on suitably supported rollers 36 and maintained in axial alignment with band 5 by guide rollers 34 engaging a peripheral groove 35 in the surface of the dependent hollow cylindrical base of said table. A ring gear 13 is formed about the periphery of said base which rotates said table about its vertical axis, by means of gear 14, shaft 15, and gear boxes 16 and 17 driven by motor 18. Motor 18 also drives wheel 2 by means of gear box 19 which supplies power to gear means on the reverse side of the support which turns a shaft and gear which engages a ring gear on the reverse side of wheel 2.

A toroidal horizontal eyelet support table 20 is mounted above table 12 for rotation therewith by means of rods 21. Spools 22 of high tensile strength filaments are supported on table 12 and the filament bands 23 are guided into proper closely vertically spaced position for wrapping around belt 5 by eyelets 24 on table 20. It should be noted that the vertical band width of the filaments 23 above table 20 and eyelets 24 has been exaggerated in FIGS. 4 and 5 for clarity in illustration. A heating chamber 25 is mounted below table 12 which is supplied with hot air from heaters 26. A series of rollers 27 are mounted within heating chamber 25 which are adapted to firmly press filaments 23 onto tacking threads 8 while the adhesive is being set in heating chamber 25. Rotary cutter blades 28 driven by motors 29 are located adjacent to the opposite edge of band 5 at a point below separation roller 6 and near guide roller 30. The finished tape 31 is removed from band 5 and reeled onto takeup reels 32 and 33 which are driven by motors (not shown. In the embodiment shown cutters are employed at opposite edges of the band 5 to produce two tapes 31. However, one cutter could be employed in which case the finished tape would have a width equal to twice the width of band 5.

In operation, wheels 2 and 3 and table 12 are all rotated in counterclockwise direction with the gearing being such that during one rotation of table 12 band 5 is advanced a distance equal to the total vertical band width of filament bands 23 to produce successive turns of nonoverlapping filament bands on band 5. While for ease of illustration three filament bands are shown as being applied, it is apparent that more or fewer filament bands may be utilized.

As band 5 advances tacking threads 8 are continuously drawn from spools 7 through glue pots 10 and onto band 5 where they are overwrapped by filaments 23. The filament wrapped band then passes into heating chamber 25 between rollers 27 which press filaments 23 firmly onto tacking threads 8 while the adhesive is setting. The band then carries the filaments to cutters 28 where they are cut longitudinally and the finished tape removed from the bands by takeup reels 32 and 33. Separation element 6 facilitates the cutting step by providing a spacing between the edge bands 5a and 5b within which the cutter blade may be inserted.

Tape can be manufactured in varying widths according to this invention by appropriate selection of the width of band 5. Additional variation in width can be obtained by using either one or two cutters or by subsequent longitudinal cutting of the tape after it has been removed from band 5. The final width of the tape is selected such that it may be conveniently used in the winding process hereinafter described.

The tape of this invention is used to provide longitudinal reinforcement for filament wound reinforced plastic pipe. Such pipe has a wall structure composed of annularly disposed high strength filaments such as glass, metal wire or whiskers, or various high strength synthetic fibers such as nylon, for example, bonded together by a matrix of a cured resin such as, for example, polyester or epoxy resin as is known to the art. Particulate material may also be incorporated in the wall structure as is more fully described in the aforementioned patent applications.

As shown schematically, FIG. 7, reinforced plastic pipe may be fabricated by coating a rotating mandrel 50 with a gel coat of a resin 51 over which may be applied a layer of veil cloth 52. The continuous tape of transverse filaments is then wound around the mandrel in such a manner that successive turns are partially overlapped and the tape is impregnated with the resin of the gel coat. Resin coated high strength filaments such as glass filaments 54 are then wound around and along the mandrel to build up the desired wall thickness. Depending upon the use to which the pipe is to be put, particulate material may be applied over the filament as described in the above noted copending patent application. Another layer of transverse reinforcing tape is applied over the filaments in partially overlapping manner near the outer surface of the pipe. Generally sufficient resin will be on the winding surface to impregnate the tape or the tape may be coated with additional resin. This layer may be followed by another layer of hoop filaments and particles. The resin is then cured and the pipe removed from the mandrel. Wall structures of pipes produced according to this invention are illustrated in FIGS. 8 and 9 with spacing between the various elements being exaggerated for clarity.

Referring now to FIG. 8 a cross section through a wall of one embodiment of pipe is shown. The wall comprises an inner surface of a gel coat of resin 51 followed by a layer of veil cloth 52, a layer of transverse tape 53 partially overlapped as shown, successive alternate layers of hoop wound high tensile strength filaments 54 and particles 55, another layer 53 of partially overlapping transverse tape, a layer of hoop wound filaments 54 and a layer of particles 55. The whole structure is bonded together by the cured resin matrix which permeates around, between and through the various layers. The matrix has not been hatched for clarity. In FIG. 8 the wall has substantial thickness and in such walls the longitudinal bending stress are concentrated at the inner and outer surfaces. Thus for maximum utilization of the transverse filament reinforcing tape the tape layers 53 should be located in proximity to the inner and outer surfaces rather than the center of the wall.

However, as shown in FIG. 9 where a relatively thin walled pipe consists of resinous matrix 60 bonding layers of hoop filaments 54 and overlapped transverse tape 53, a layer of tape 53 may be employed within the wall structure.

While this invention has been described with respect to the several embodiments thereof the invention should not be construed as limited thereto. Various modifications will suggest themselves to workers skilled in the art and can be made without departing from the scope of this invention which is limtied only by the following claims wherein:

1. A continuous tape making machine comprising in combination:
   (a) mandrel-conveyor means consisting essentially of a flat continuous band element having two aligned substantially planar external surfaces and two aligned substantially planar internal surfaces,
   (b) means for continuously driving said mandrel-conveyor in the longitudinal direction,
   (c) means disposed along the path of said mandrel-conveyor for continuously applying adhesive coated longitudinally extending continuous threads to opposite sides of said mandrel-conveyor, said threads lying substantially parallel to the edges of said mandrel-conveyor,
   (d) means disposed along the path of said mandrel-conveyor for continuously wrapping high tensile strength filaments in nonoverlapping orientation around said mandrel-conveyor and over said threads exclusively,
   (e) means disposed along the path of said mandrel-conveyor for bonding said filaments to said threads while said filaments and threads are on said mandrel-conveyor, and
   (f) means for cutting said filaments disposed along the path of said mandrel-conveyor and the bonded filaments and threads, said means for cutting said filaments extending between said internal surfaces of said mandrel-conveyor whereby a longitudinal extending tape may be removed from said mandrel-conveyor.

2. The machine of claim 1 further comprising means for separating said internal surfaces of said band element located past said cutting means.

3. A tape making machine comprising in combination:
   (a) a pair of spaced wheels mounted for rotation in the same plane,
   (b) a mandrel-conveyor consisting essentially of a flat continuous band element having two aligned substantially planar external surfaces and two aligned substantially planar internal surfaces mounted around said wheels and movable therewith whereby said mandrel-conveyor may be driven in a longitudinal direction as said wheels rotate,
   (c) a toroidal winding platform located intermediate of said wheels and around said mandrel-conveyor having its axis coaxial with the center of said mandrel-conveyor and mounted for rotation in a plane perpendicular to the axis of said mandrel-conveyor,
   (d) means for continuously applying adhesive coated continuous threads to the opposite sides of said mandrel-conveyor said threads being substantially parallel to the edges of said mandrel-conveyor.
   (e) a plurality of filaments sources mounted on said winding platform,
   (f) wrapping means for wrapping filaments obtained from said filament sources around said mandrel-conveyor and said adhesive coated continuous threads exclusively, said wrapping means comprising guide means disposed on said platform associated with each of said filament sources and maintaining predetermined spacing of filaments obtained from said sources,
   (g) means for driving said winding platform and said mandrel-conveyor at rate such that for one complete revolution of said winding platform, said mandrel-conveyor advances a distance slightly greater than said predetermined width whereby nonoverlapping windings of filaments are applied around said band and over substantially all of said threads exclusively,
   (h) means for bonding said filaments to said threads while said filaments and threads are on said mandrel-conveyor, and
   (i) means for cutting said filaments extending between said internal surfaces of said mandrel-conveyor whereby said filaments may be severed and a longitudinally extending tape removed from said mandrel-conveyor.

4. The machine of claim 3 further comprising means for separating said internal surfaces of said mandrel located past said cutting means.

References Cited

UNITED STATES PATENTS

| | | | |
|---|---|---|---|
| 3,318,746 | 5/1967 | Langlois | 156—181 |
| 3,314,840 | 4/1967 | Lloyd et al. | 156—181 |
| 3,537,937 | 11/1970 | Medney | 156—426 |
| 3,041,230 | 6/1962 | Diehl | 156—172 |
| 2,954,817 | 10/1960 | Havemann | 156—427 |

DANIEL J. FRITSCH, Primary Examiner

U.S. Cl. X.R.

156—174, 175, 428, 430, 433, 441, 443